United States Patent
Jayakody

(10) Patent No.: US 8,700,451 B2
(45) Date of Patent: Apr. 15, 2014

(54) SYSTEMS AND METHODS FOR TRACKING CONSUMERS

(75) Inventor: Prasantha Jayakody, Seattle, WA (US)

(73) Assignee: Vulcan IP Holdings Inc., Seattle, WA (US)

(*) Notice: Subject to any disclaimer, the term of this patent is extended or adjusted under 35 U.S.C. 154(b) by 825 days.

(21) Appl. No.: 12/260,889

(22) Filed: Oct. 29, 2008

(65) Prior Publication Data
US 2010/0106597 A1 Apr. 29, 2010

(51) Int. Cl.
G06Q 30/00 (2012.01)

(52) U.S. Cl.
USPC .......................................... 705/14.1

(58) Field of Classification Search
CPC ..................................... G06Q 30/00
USPC .......................................... 705/14.1
See application file for complete search history.

(56) References Cited

U.S. PATENT DOCUMENTS

| | | | |
|---|---|---|---|
| 5,841,987 A | 11/1998 | Blatter et al. | 395/200.66 |
| 5,854,887 A | 12/1998 | Kindell et al. | |
| 5,973,683 A | 10/1999 | Cragun et al. | 345/327 |
| 5,995,134 A | 11/1999 | Hayashi | |
| 6,526,335 B1 | 2/2003 | Treyz et al. | |
| 6,542,185 B1 | 4/2003 | Bogardus | |
| 6,574,793 B1 | 6/2003 | Ngo et al. | 725/32 |
| 6,631,356 B1 | 10/2003 | Van Horn et al. | 705/26 |
| 6,904,408 B1 | 6/2005 | McCarthy et al. | 705/2 |
| 6,968,565 B1 | 11/2005 | Slaney et al. | 725/10 |
| 7,027,054 B1 | 4/2006 | Cheiky et al. | 345/473 |
| 7,187,786 B2 | 3/2007 | Kee | |
| 7,302,475 B2 | 11/2007 | Gold et al. | 709/217 |
| 7,319,779 B1 | 1/2008 | Mummareddy et al. | 382/118 |
| 7,340,439 B2 | 3/2008 | Burger et al. | |
| 7,364,068 B1 | 4/2008 | Strubbe et al. | 235/376 |
| 7,440,674 B2 | 10/2008 | Plotnick et al. | |
| 7,505,621 B1 | 3/2009 | Agrawal et al. | 382/159 |
| 7,574,727 B2 | 8/2009 | Nathan et al. | 725/100 |
| 7,584,150 B2 | 9/2009 | Hirotsune et al. | 705/52 |
| 7,584,353 B2 | 9/2009 | Risan et al. | 713/164 |
| 7,664,124 B2 | 2/2010 | Alston et al. | 370/401 |
| 7,895,076 B2 | 2/2011 | Kutaragi et al. | |
| 2002/0062481 A1 | 5/2002 | Slaney et al. | 725/42 |
| 2002/0112171 A1 | 8/2002 | Ginter et al. | |
| 2002/0125993 A1 | 9/2002 | Gutta et al. | 340/5.52 |
| 2003/0088832 A1 | 5/2003 | Agostinelli et al. | |
| 2003/0126013 A1* | 7/2003 | Shand | 705/14 |
| 2004/0003393 A1 | 1/2004 | Gutta et al. | 725/25 |
| 2004/0073482 A1 | 4/2004 | Wiggins et al. | |
| 2004/0093264 A1 | 5/2004 | Shimizu | |

(Continued)

FOREIGN PATENT DOCUMENTS

| | | |
|---|---|---|
| JP | 2005293491 A | 10/2005 |
| WO | 03/043336 A1 | 5/2003 |
| WO | WO 03/043336 | 5/2003 |

*Primary Examiner* — Daniel Lastra
(74) *Attorney, Agent, or Firm* — Dorsey & Whitney LLP

(57) ABSTRACT

A system and method for tracking a consumer is provided. A consumer is detected at a first location within a vicinity of a content player playing a content item. A unique identification of the consumer is captured, such as a facial image or a Bluetooth signal emitted by a device associated with the consumer in some embodiments. A record is stored indicating the consumer perceived the content item. As the consumer perceives other content items or travels to other locations, the record is updated to reflect the consumer's behavior.

29 Claims, 3 Drawing Sheets

(56) References Cited

U.S. PATENT DOCUMENTS

| | | | |
|---|---|---|---|
| 2004/0111360 A1* | 6/2004 | Albanese | 705/38 |
| 2005/0038749 A1 | 2/2005 | Fitch et al. | |
| 2005/0171897 A1 | 8/2005 | Forsythe et al. | |
| 2005/0288954 A1 | 12/2005 | McCarthy et al. | 705/1 |
| 2006/0093998 A1* | 5/2006 | Vertegaal | 434/236 |
| 2006/0100980 A1 | 5/2006 | Reed et al. | 707/1 |
| 2006/0117341 A1 | 6/2006 | Park | 725/34 |
| 2006/0136294 A1 | 6/2006 | Linden et al. | |
| 2006/0147192 A1 | 7/2006 | Zhang et al. | 396/263 |
| 2006/0174261 A1 | 8/2006 | Cline, Jr. et al. | 725/20 |
| 2006/0188109 A1 | 8/2006 | Makino et al. | 381/86 |
| 2006/0282465 A1 | 12/2006 | Sharma | 707/104.1 |
| 2007/0073589 A1* | 3/2007 | Vergeyle et al. | 705/14 |
| 2007/0089125 A1 | 4/2007 | Claassen | 725/9 |
| 2007/0150340 A1 | 6/2007 | Cartmell | 705/14 |
| 2007/0179852 A1 | 8/2007 | Martin et al. | |
| 2008/0147488 A1 | 6/2008 | Tunick et al. | |
| 2008/0154671 A1 | 6/2008 | Delk | |
| 2008/0167992 A1 | 7/2008 | Kokernak et al. | |
| 2008/0183560 A1 | 7/2008 | Kaplan et al. | 705/10 |
| 2008/0183575 A1 | 7/2008 | Kaplan et al. | 705/14 |
| 2008/0189168 A1 | 8/2008 | Kaplan et al. | |
| 2009/0048908 A1 | 2/2009 | Kaplan et al. | 705/10 |
| 2009/0142038 A1 | 6/2009 | Nishikawa | |
| 2010/0106597 A1 | 4/2010 | Jayakody | |

* cited by examiner

SYSTEMS AND METHODS FOR TRACKING CONSUMERS

TECHNICAL FIELD

The invention relates to techniques and systems for tracking consumer behavior, advertising impressions, or both, by generating a unique representation of the consumer and tracking the consumer based on the unique representation.

BACKGROUND OF THE INVENTION

Advertisers and other business entities are increasingly interested in information regarding consumers. Approximate statistics, such as readership of a newspaper, or ratings of a television program, are often insufficient because the advertiser cannot know how many of those readers or viewers actually viewed the advertisement. With the rise of Internet advertising, advertisers may be given information regarding a number of times their ad was rendered on a display, or the number of times someone "clicked through" to view a website pointed to by the advertisement. These are measures of the number of impressions the advertisement made, where an impression results from a person perceiving an advertisement.

Information regarding readership, viewership, or number of displays or clickthroughs of an advertisement, falls short of providing information about the actual people who viewed the ad, and whether or not they acted after viewing the ad by, for example, purchasing a product highlighted in the advertisement. Personal information regarding consumers of advertising would be valuable to advertisers in order to improve the targeting of their ad and to receive feedback on the effectiveness of the advertising.

DETAILED DESCRIPTION

Certain details are set forth below to provide a sufficient understanding of embodiments of the invention. However, it will be clear to one skilled in the art that not all described details may be necessary for all embodiments of the invention. In some instances, well-known circuits, control signals, timing protocols, computer systems, and software operations have not been shown in detail in order to avoid unnecessarily obscuring the described embodiments of the invention.

Embodiments of the present invention recognize the presence of an individual in the vicinity of a content display. A unique representation of the consumer can then be stored. The term "consumer" is used to describe individuals tracked by embodiments of the present invention and the individuals tracked do not need to actually consume anything or intend to purchase anything. Subsequent behavior of the consumer can be tracked by recognizing the same individual in the vicinity of a second content display, or in a second location. In this manner, a content provider, such as an advertiser, may receive information regarding specific consumers of their content—what other content the consumers viewed, or where the consumers went, for example.

Generally any unique identifier of the consumer's presence in the vicinity of a content display may be recorded—including a portion of the consumer's visual appearance, such as their face or other biomarker, or a unique signal emitted by a personal device carried by the consumer may be detected, such as a Bluetooth signal emitted by a consumer electronics device carried by the consumer or a signal received by interrogating an RFID tag associated with the consumer. The unique identifier may then be stored in a manner which obscures the actual identity of the consumer for privacy or other purposes. For example, a facial image may be manipulated to create a 'fingerprint'—a representation of the facial image uniquely derived from the image but from which the image itself cannot be easily recreated. One-way hash functions are known in the art for creating such a fingerprint file. Storing the fingerprints may allow for consumer tracking on an individual basis without compromising the actual identity of the consumer.

Figure 1:
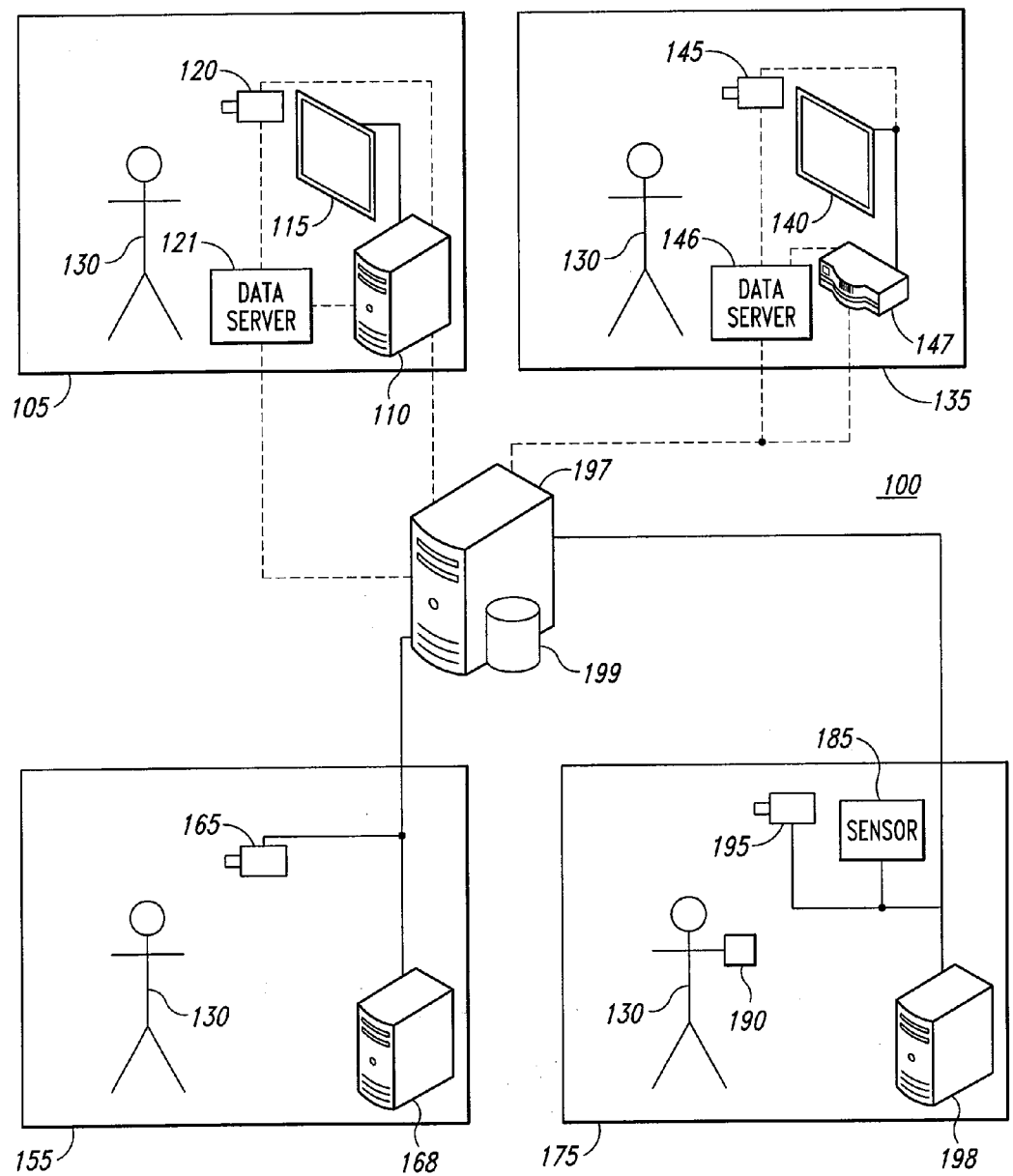
FIG. 1 is a schematic illustration of a system according to an embodiment of the present invention.

An embodiment of a system 100 according to the present invention is shown in FIG. 1. Several locations 105, 135, 155, and 175 are equipped for use in the system 100. Each location 105, 135, 155, and 175, corresponds with a consumer sensor 120, 145, 165, and 185, respectively coupled to a respective data server 121, 146, 168, and 198. Each sensor 120, 145, 165, and 185 operates to detect the presence of a consumer 130. The sensors 120, 145, and 165 are depicted as cameras, which may capture an image of the face of the consumer 130. Other sensors may also be used such as thermal imaging camera sensors, infrared sensors, pressure sensors, video imaging camera sensors, sonar sensors, laser sensors, audio sensors, motion sensors, RFID tag sensors, and Bluetooth sensors. The sensor 185 may detect a signal emitted from a personal electronic device 190 carried by the consumer 130, such as a Bluetooth or RFID signal. The location 175 further includes a second sensor 195, a camera, which may obtain an image of the face of the consumer 130, which may be correlated with the Bluetooth signal received by the sensor 185 and/or correlated with data received by the sensors 120, 145, and 165 in the system 100. In other embodiments of systems according to the present invention, however, cameras may not be used at some or all locations in the system, and signals emitted by consumer devices may be used alone to track consumer behavior. The data servers 121, 146, 168, and 198 may control the sensors 120, 145, 165, 185, and 195. The data servers receive sensor information from the respective sensor 120, 145, 165, and 185 and 195 and generate data related to the information. In some embodiments, some or all of the sensors may instead or in addition be coupled to a media delivery system manager 110 and 147, as will be described further below.

Each location 105, 135, 155, and 175 may correspond to a different physical building, or different regions (such as departments) of a same building. Each location may, for example, represent a different place of business or different departments within a same place of business, or a combination of both types of locations.

The locations 105 and 135 are equipped with content players 115 and 140, respectively. The content players 115 and 140 are shown as displays for the visual display of content to the consumer 130, but could be audio players, or may play a combination of audio and video content. Other locations 155 and 175 in the system 100 do not have content players and are used to track the presence of the consumer 130 rather than delivering or monitoring the viewing of content.

The location 105 is equipped with a media delivery system manager 110 in electronic communication with a content player 115. The media delivery system manager 110 may further be in communication with the data server 121, the sensor 120, or both. The content player 115 is depicted as a display device, but as previously discussed, may be an audio player, or a device with a combination of video and audio capabilities. The content player 115 displays content for receipt by a consumer. The sensor 120, depicted in FIG. 1 as a camera, captures a unique identification of a consumer 130 in the vicinity of the content player 115. The sensor 120 may capture any type of unique identification of the consumer 130, as generally described above, and in accordance with the capabilities of the particular sensor 120 used. The data server 121 receives information representing the unique identification from the sensor 120 and generates data related to the information.

At the location 105, a media delivery system manager 110 is coupled to the content player 115, and may be coupled to the sensor controller and data server 121 and the sensor 120 as well. The media delivery system manager 110 includes a processor and a memory and is configured to couple content to the content player 115 and may receive data from the sensor controller and data server 121. Although not shown, other input and output devices may be coupled to the media delivery system manager 110 to control or interact with the media delivery system manager 110. The media delivery system manager 110 may be a computer system, as shown, or generally any other processor-based system 147 (depicted in location 135). The processing or communication capabilities, or both, of the media delivery system manager 110 could be integrated into the content player 115, data server 121, sensor 120, or any combination thereof.

The data server 121 may be in communication with a central server 197 to provide it with data resulting from the capture of unique identification information for a consumer. The media delivery system manager 110 may also be in communication with the central server 197. In some embodiments, the data server 121 may be coupled to the media delivery system manager 110, and data coupled to the central server 197 from the data server 121 through the media system. The media delivery system manager 110 may receive content from the central server 197 for transmission to the content player 115. As described further below, the content received by the content player 115 may be selected and played according to any of a variety of rules. Communication between the data server 121, the media delivery system manager 110 and the central server 197 may occur in generally any manner, including wired or wireless communication. The central server 197 is in communication with a database 199. The database 199 may store content to be delivered for playback by one or more of the content players 115 and 140. The database 199 may further store data received by one or more of the sensors 120, 145, 165, 185, and 195, as described further below. Although a single database 199 is shown in FIG. 1, one or more databases may be used.

Figure 2:
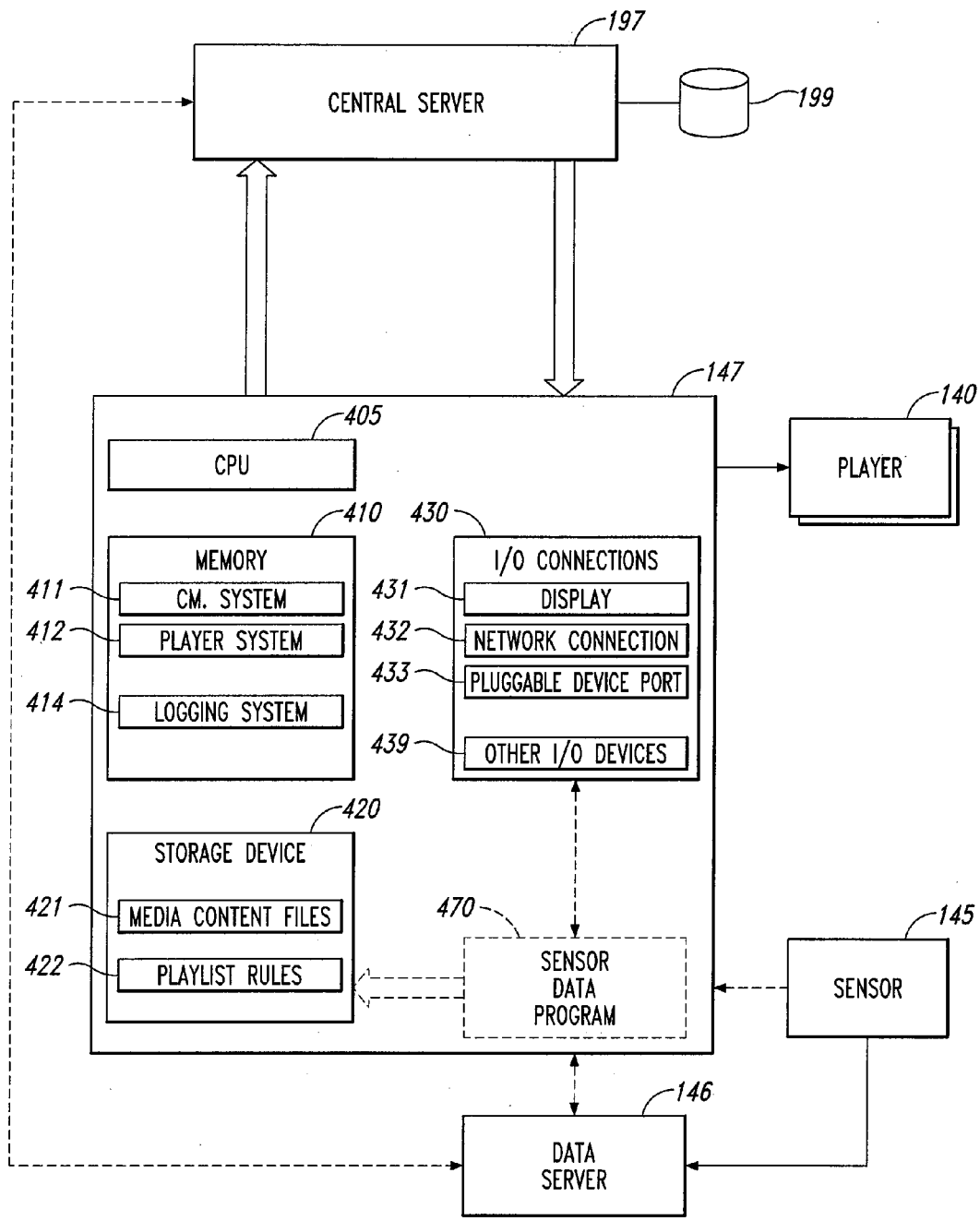
FIG. 2 includes a schematic illustration of a content delivery controller according to an embodiment of the present invention.

An embodiment of the setup in location 135 and the central server 197 that may be used in the system 100 is shown in FIG. 2. The media delivery system manager 147 includes, among other things, a processor 405, a content management system 411, a player system 412, and a logging system 414. Although discussed in terms of such components and programs, which may include computer executable instructions encoded on one or more computer readable media such as the memory 410, other embodiments are possible with other arrangements of programs to perform the disclosed functionalities. For example, the content management system 411 and the logging system 414 may be included in the media delivery system manager 147 while the player system 412 may be physically separate from the media delivery system manager 147. Indeed, any of the functions of the content management system 411 the player system 412, and the logging system 414 may be performed by devices or systems that are physically separate.

The player system 412, along with the content player 140, may be used to play items of content for one or more consumers. Content, which may be encoded as audio or video files, or both, may be stored in storage device 420. Examples of storage devices 420 include hard drives, flash memory, remote server, network attachable storage and other types of non-volatile storage and memory devices. The storage device 420 storing content for playback by the player 140 may be located at the location 135, or may be in a remote location. The stored content may be accessible to a single player, or multiple players throughout the system. In some embodiments, the content may be stored in the database 199 or other memory device accessible to the central server 197. A particular content item may be selected by the content management system 411 for playback and may be played back by the player 140 or by the player system 412. In some embodiments, the content management system 411 responsible for selecting the content for playback by the player 140 may reside at the central server 197.

Typically, the content 421 is rendered as digital or analog signals which are routed to input/output (I/O) connections 430 on the media delivery system manager 147. For example, in the case of a video content item, video signals may be routed to the display I/O connection 431. Other types of media, such as audio or pictures, may be routed to other devices through respective connectors 439. The I/O connections 430 may further include a network I/O connection 432 for routing signals between the media delivery system manager 147 and a network, and for example, for communicating with the central server 197 and the database 199. The network I/O connection 432 may include, for example, a modem connection or an 802.11x WiFi connection. A pluggable device port I/O connection 433 may be used to connect the set-top box 147 to a pluggable device.

In some embodiments, the output and input connectors 430 follow A/V industry standard formats, such as component, composite, VGA, DVI, and/or HDMI. Accordingly, the media delivery system manager 147 may be able to process MP3, MPEG2, MPEG4, AVI, and/or Windows Media files such as WMA and WMV. These media formats are listed for illustrative purposes only and other types of media may be played back by the player 140.

The sensor 145 detects a presence of a consumer in the vicinity of the player 140. The sensor 145 is generally designed to detect when a consumer is within sufficient range to be experiencing the content played on the player 140. In other embodiments, the sensor 145 may simply detect the presence of a consumer within the range of detection by the sensor. In other embodiments, the sensor 145 may detect consumers within a certain distance of the player, or who remain within the range of the sensor or other area for a certain amount of time. In other embodiments, the sensor 145 may be able to detect, for example, by detecting eye placement or direction, the consumer was actually looking at or in the direction of the player 145. Other information may be collected by the sensor 145 or other environmental sensors coupled to the media delivery system manager 147. Foottraffic, dwell time, or view time of the content may also be detected by the sensor 145, or other sensors.

The sensor 145 and others may be connected to the media delivery system manager 147, the data server 146, or both, through, for example, a wired connection, which may include Ethernet, RS-232 serial, USB or modem connection, or wirelessly through, for example, an 802.11x WiFi network, or a Bluetooth or Infra-Red connection.

Sensor data may be stored by the data server 146, the media delivery system manager 147, or both. The sensor data may be manipulated by a sensor data program 470 which may be executed by a processor associated with the media delivery system manager 147, the data server 146, or combinations thereof. The sensor data program 470, which may include executable instructions encoded on a computer readable media causing the processor 405 to execute various functions, may process signals received from the sensor 145. The sensor data program 470 may use various parameterized algorithms to determine whether the sensor 145 has detected a consumer in the vicinity, and to capture a unique identification of the consumer. The sensor data program 470 may also process the data received from the sensor 145 to generate a fingerprint of the data, such as by applying a hash function, such that a unique identification of the consumer is obtained without completely compromising the actual identity of the consumer. In some embodiments, the fingerprint may be generated outside of the media delivery system manager 147, including by the sensor 145 itself, or by the central server 197. Sensors, including the sensor 145, may be integrated with the media delivery system manager 147 or may be installed anywhere within a suitable vicinity of the media delivery system manager 147 and player 140, including on a wall, ceiling, or floor, within widows or doors, or free-standing.

Sensor data may be processed by the logging system 414 on the media delivery system manager 147, or may be sent to the central server 197 for processing. The player system 412 may communicate with the logging system 414 to provide playback information, such as playback state and metadata, of the content played by the player 140 during all or a portion of a time a consumer was detected by the sensor 145. The logging system 414 may aggregate and correlate playback information, duration of the content, and/or a timestamp of the content playback time or together with data from the sensor 145, or fingerprint generated based on data from the sensor 145. The logging system may then communicate information to the central server 197. In other embodiments, a program on the central server 197 may correlate the content played while the consumer was detected with the consumer. Methods for gathering information are described further below.

As generally discussed above, content for playback by the player 140 may include video, audio and/or still images. The content may be managed by the content management system 411, part of the media delivery system manager 147 in FIG. 2, but may reside on the central server 197 in other embodiments, or its functionality shared between the media delivery system manager 147 and the central server 197. The content management system 411 may reference playlist rules 422 to select what content 421 should be loaded on the media delivery system manager 147 for storage for later playback and rules that govern when or how often particular content is to be played by the player 140. The rules 422 and content 421 may be stored on the central server 197 in other embodiments, or the storage of the rules 422 and content 421 may be shared between the media delivery system manager 147 and the central server 197. Any of a variety of playlist rules may be specified, and data from the sensor 145 may be used to modify the playlist rules or generate new rules. For example, if a consumer is detected in the vicinity of the player 140, and the system recognizes, based on the unique identification of the consumer generated, the consumer is known to the system, a playlist rule may indicate specific content be played by the player 140 for the purposes of targeting that particular consumer.

Other playlist rules and methods for generating and altering rules may be found in the following U.S. patent applications, each of which is incorporated herein by reference in its entirety for any purpose: (1) Ser. No. 11/761,761 filed Jun. 12, 2007 and entitled "Back-Channel Media Delivery System;" (2) Ser. No. 11/981,636, filed Oct. 30, 2007 and entitled "Back-Channel Media Delivery System;" and (3) Ser. No. 12/011,331, filed Jan. 25, 2008 and entitled "System and Method for Publishing Advertising on Distributed Media Delivery System."

Figure 3:
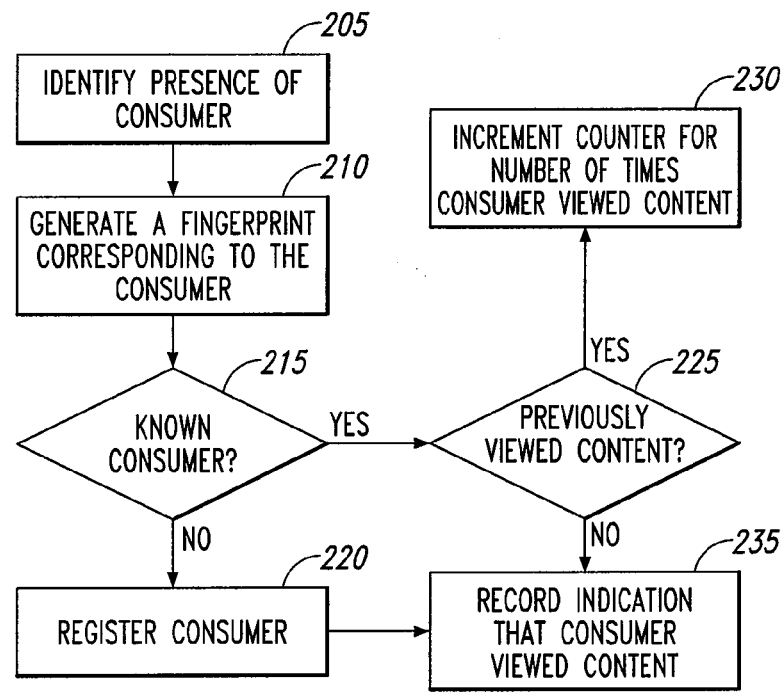
FIG. 3 is a schematic illustration of a method of tracking a number of times content is perceived by a consumer according to an embodiment of the present invention.

The above discussion described a general architecture of a system 100 according to an embodiment of the present invention. Operation of the system 100 will now be described with reference to FIGS. 3 and 4. FIG. 3 illustrates a method of tracking a number of times a particular consumer experiences playback of content. When one of the sensors 120, 145 identifies 205 a consumer in the vicinity of the content player 115, 140, the data server 146 receives signals from the sensor 120, 145 and generates information associated with the identified consumer that is provided to the media delivery system manager 110, 147, respectively, or in some embodiments to the central server 197. In some embodiments, a valid detection occurs only after a threshold time in the area, or when a consumer is detected looking at or in the direction of the content player 115, 140, or when the consumer has looked at or in the direction of the content player 115, 140 for longer than a threshold time. The threshold time may be a time considered valid for the content to have caught the attention and been perceived by the consumer. For example, in one embodiment the threshold time is about 2 seconds.

The information obtained by the sensor and associated with the detected consumer may be a Bluetooth signal, a facial image, or an RFID signal, as generally described above. The media delivery system manager 110, 147 or the central server 197 identifies what content the user experienced by comparing a time the user was in the vicinity of the content player 115 or 140 and records indicating what content was being played at that time. The relevant records may be stored on the media delivery system managers 110 and 147, or the central server 197, or both. Similarly, the comparison may be performed by any of those devices, or a combination of them.

In the case of facial images, a fingerprint may be generated 210 that uniquely identifies the consumer. As generally described above, this may allow tracking of the consumer through a unique consumer identification that does not compromise the consumer's actual identity. The fingerprint, or other unique consumer identification, may be compared with those already stored in the database 199 to determine if the consumer is already known to the system 215. If the consumer is not known to the system, the consumer may be registered 220 by storing the fingerprint or other unique identifier in the database 199. Once registered, an indication may be stored in the database 199 that the consumer perceived the content while it was playing and while the user was detected in the vicinity of the content player 115, 140.

Along with the unique identifier of the consumer, other demographic information of the consumer may be recorded. For example, when the unique identifier is based on a facial image or other biomarker, the facial image or biomarker may be analyzed to determine demographic information of the consumer, including, for example height, weight, gender, race, or other demographic or classifying information. This information may also be transmitted to the central server 197 and/or stored to facilitate later reporting by demographic class.

If the consumer is known to the system, a comparison of data associated with the consumer is made 225 to determine if the consumer had previously perceived the content. If the consumer had previously perceived the content, a counter may be incremented 230 to indicate the number of times the consumer perceived the content. If the consumer had not previously perceived the content, a record may be stored 235 reflecting that the consumer perceived the content.

Figure 4:
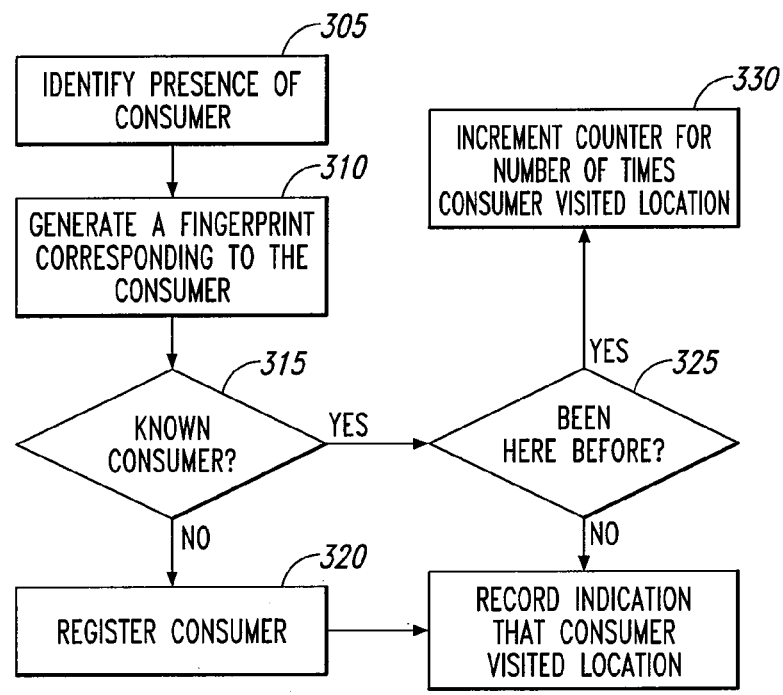
FIG. 4 is a schematic illustration of a method of tracking locations visited by a consumer according to an embodiment of the present invention.

FIG. 4 depicts a method for tracking the locations within the system 100 visited by a consumer. Similar to the method described above with regard to FIG. 3, but now including sensors that are in locations not associated with a content player. When one of the sensors 120, 145, 165, 185, 195 identifies 305 the presence of a consumer in a respective location 105, 135, 155, 175, the data server 121, 146, 168, 198, receives signals from the respective sensor 120, 145, 165, 185, 195, and generates information associated with the identified consumer that is provided to the media delivery system managers 110, 147, respectively, or in some embodiments to the central server 197. The information associated with the identified consumer may be a Bluetooth signal, a facial image, or an RFID signal, as generally described above.

In the case of facial images, a fingerprint may be generated 310 that uniquely identifies the consumer. As generally described above, this may allow tracking of the consumer through a unique consumer identification that does not compromise the consumer's actual identity. The fingerprint, or other unique consumer identification, may be compared with those already stored in the database 199 to determine 315 if the consumer is already known to the system. If the consumer is not known to the system, the consumer may be registered 320 by storing the fingerprint or other unique identifier in the database 199. Once registered, an indication may be stored in the database 199 that the consumer was in the detected location at the detected time. For example, a date/time stamp may be stored along with an indication of the location at which the consumer was detected.

If the consumer is known to the system, a comparison of data associated with the consumer is made 325 to determine if the consumer had previously visited the location. If the consumer had previously been detected at the location, a counter may be incremented 330 to indicate the number of times the consumer was detected in the location. If the consumer had not previously been detected at the location, a record may be stored 335 reflecting that the consumer was detected in the location.

In this manner described above with reference to FIGS. 3 and 4, records may be stored in the database 199 reflecting times and dates that a particular consumer was at a variety of locations and what content the consumer perceived at each location. Aggregate counts may also be developed reflecting the number of times a particular consumer experienced a specific item of content or was detected in a specific location. In this manner, content providers may receive information reflecting where consumers went after perceiving their content, the number of individual, unique consumers who perceived the content, and the number of times each perceived it, as well as the location where they perceived the content. Any or all of this information may be used to modify or create new rules for the playback of content by the content players 115 and 140.

Systems and methods according to embodiments of the present invention may be used along with systems and methods disclosed in the following applications, each of which is hereby incorporated by reference in its entirety for any purpose: (1) Ser. No. 11/761,761 filed Jun. 12, 2007 and entitled "Back-Channel Media Delivery System;" (2) Ser. No. 11/981,636, filed Oct. 30, 2007 and entitled "Back-Channel Media Delivery System;" and (3) Ser. No. 12/011,331, filed Jan. 25, 2008 and entitled "System and Method for Publishing Advertising on Distributed Media Delivery System."

From the foregoing it will be appreciated that, although specific embodiments of the invention have been described herein for purposes of illustration, various modifications may be made without deviating from the spirit and scope of the invention.

What is claimed is:

1. A method for tracking a consumer comprising:
   detecting a consumer at a first location within a vicinity of a content player playing a content item;
   capturing a unique identification of the consumer;
   determining whether the consumer experienced content of the content player based, at least in part, on environmental data collected over a period of time; and
   storing a record indicating the consumer experienced the content item.

2. The method for tracking a consumer according to claim 1 wherein the act of capturing a unique identification comprises receiving a Bluetooth signal emitted by a device associated with the consumer.

3. The method for tracking a consumer according to claim 1 wherein the act of capturing a unique identification comprises reading an RFID tag associated with the consumer.

4. The method for tracking a consumer according to claim 1 wherein the act of capturing a unique identification comprises capturing a facial image of the consumer.

5. The method for tracking a consumer according to claim 4 wherein the act of capturing a unique identification comprises generating a fingerprint from the captured facial image.

6. The method for tracking a consumer according to claim 5 wherein the act of generating the fingerprint comprises applying a one-way hash function to the captured facial image.

7. The method for tracking a consumer according to claim 1 further comprising:
   detecting the consumer at a second location;
   capturing the unique identification of the consumer at the second location; and
   updating the record to reflect the consumer visited the second location.

8. The method for tracking a consumer according to claim 1 further comprising:
   detecting the consumer in the vicinity of the content player or another content player playing the content item;
   capturing the unique identification of the consumer; and
   updating the record to reflect the consumer experienced the content item another time.

9. The method for tracking a consumer according to claim 1 wherein the record comprises a time stamp indicating a time during which the consumer was detected in the vicinity of the content player.

10. The method for tracking a consumer according to claim 1 wherein the act of detecting the consumer comprises detecting the consumer has remained in the vicinity of the content player for a threshold time.

11. The method for tracking a consumer according to claim 1 wherein the act of detecting the consumer comprises detecting the consumer is looking at the content player.

12. A computer program product for tracking consumers, the computer program product comprising a computer readable medium encoded with instructions that, when executed, cause a processor to:
   receive a first transmission indicating a first consumer experienced a first content item corresponding to a content player at a first location, the transmission including a unique identification of the first consumer, the unique identification based, at least in part, on environmental data corresponding to the first consumer;
   access computer readable storage and search for a record containing the unique identification of the first consumer;
   update the record to reflect the first consumer experienced the first content item in the first location when the record is found;
   store a new record reflecting the first consumer experienced the first content item in the first location when the record is not found.

13. The computer program product according to claim 12 wherein the unique identification of the first consumer comprises a Bluetooth signal emitted by a device associated with the consumer.

14. The computer program product according to claim 12 wherein the unique identification of the first consumer comprises a facial image of the consumer.

15. The computer program product according to claim 14 further comprising instructions causing the processor to generate a fingerprint based on the received facial image.

16. The computer program product according to claim 12 further comprising instructions causing the processor to:
   receive a second transmission indicating the first consumer visited a second location, the second transmission including the unique identification of the first consumer; and
   access and update the record to indicate the first consumer visited the second location.

17. The computer program product according to claim 12 further comprising instructions causing the processor to:
   receive a second transmission indicating the first consumer looked in the direction of the content player at the first location or another location; and
   update the record to reflect the first consumer experienced the first content item a second time.

18. The computer program product according to claim 17 further comprising instructions causing the processor to transmit the record to a content provider.

19. The computer program product according to claim 12 wherein the content player is configured to provide an advertisement.

20. A system for tracking consumers, the system comprising:
   a first content player and a first computing device at a first location, the first content player configured to playback content items based on playback rules stored on the first computing device;
   a first sensor coupled to the first computing device and configured to detect whether a first consumer in a vicinity of the first content player experienced the content items and capture a unique identification of the first consumer, the first computing device configured to receive the unique identification;
   a second sensor at a second location and coupled to a second computing device and configured to detect the presence of the first consumer and capture the unique identification of the first consumer, the second computing device configured to receive the unique identification; and
   a central server coupled for communication with the first and second computing devices, the central server configured to receive the unique identification from the first computing device and an indication that a first content item was playing during a first time the first consumer was in the vicinity of the first playback device, the central server further configured to receive the unique identification from the second computing device, the central server configured to store a record indicating the first consumer experienced the first content item and visited the second location,
   wherein at least one of the first sensor and the second sensor is configured to capture the unique identification of the first consumer without receiving input from the first consumer.

21. The system according to claim 20 further comprising:
   a second content player at the second location, the second content player configured to playback content items to consumers based on playback rules stored on the second computing device; and
   the central server further configured to receive an indication that the first content item was playing during a second time the first consumer was in the vicinity of the second playback device, and store a record indicating the first consumer experienced the first content item at least two times.

22. The system according to claim 21 wherein the system further comprises:
   a third sensor at a third location configured to detect the first consumer at the third location and capture the unique identification of the first consumer;
   a third computing device coupled to the third sensor and configured to receive the unique identification of the first consumer; and
   wherein the central server is further configured to update the record to indicate the first consumer visited the third location.

23. The system according to claim 20 wherein the unique identification comprises a Bluetooth signal emitted by a device associated with the first consumer.

24. The system according to claim 20 wherein the unique identification comprises a signal encoded by an RFID tag associated with the consumer.

25. The system according to claim 20 wherein the unique identification comprises a facial image of the first consumer.

26. The system according to claim 25 wherein the central server is configured to store a fingerprint based on the facial image of the first consumer.

27. The system according to claim 20 wherein the central server is further configured to update the playback rules stored on the first or second computing devices based on the record.

28. The system according to claim 20 wherein the first sensor is further configured to detect a presence of a second consumer and capture a unique identification of the second consumer, the central server further configured to receive the unique identification of the second consumer and store a second record corresponding to the second consumer.

29. The system according to claim 20 wherein the first and second locations each comprise a different department within a store.

* * * * *